E. J. WILLIS.
LATHE TOOL.
APPLICATION FILED SEPT. 2, 1920.
1,419,432.
Patented June 13, 1922.
2 SHEETS—SHEET 1.
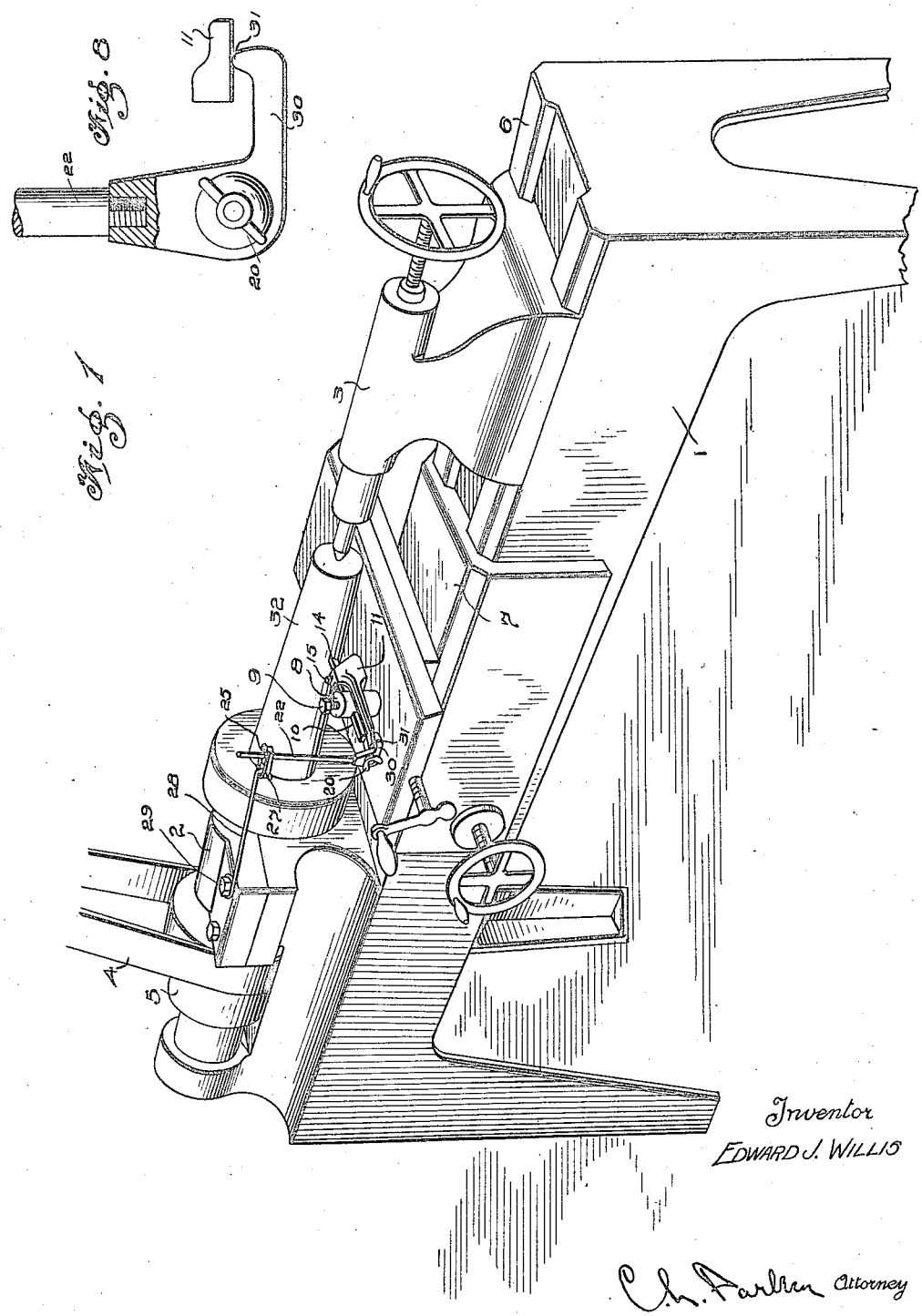
Inventor
EDWARD J. WILLIS

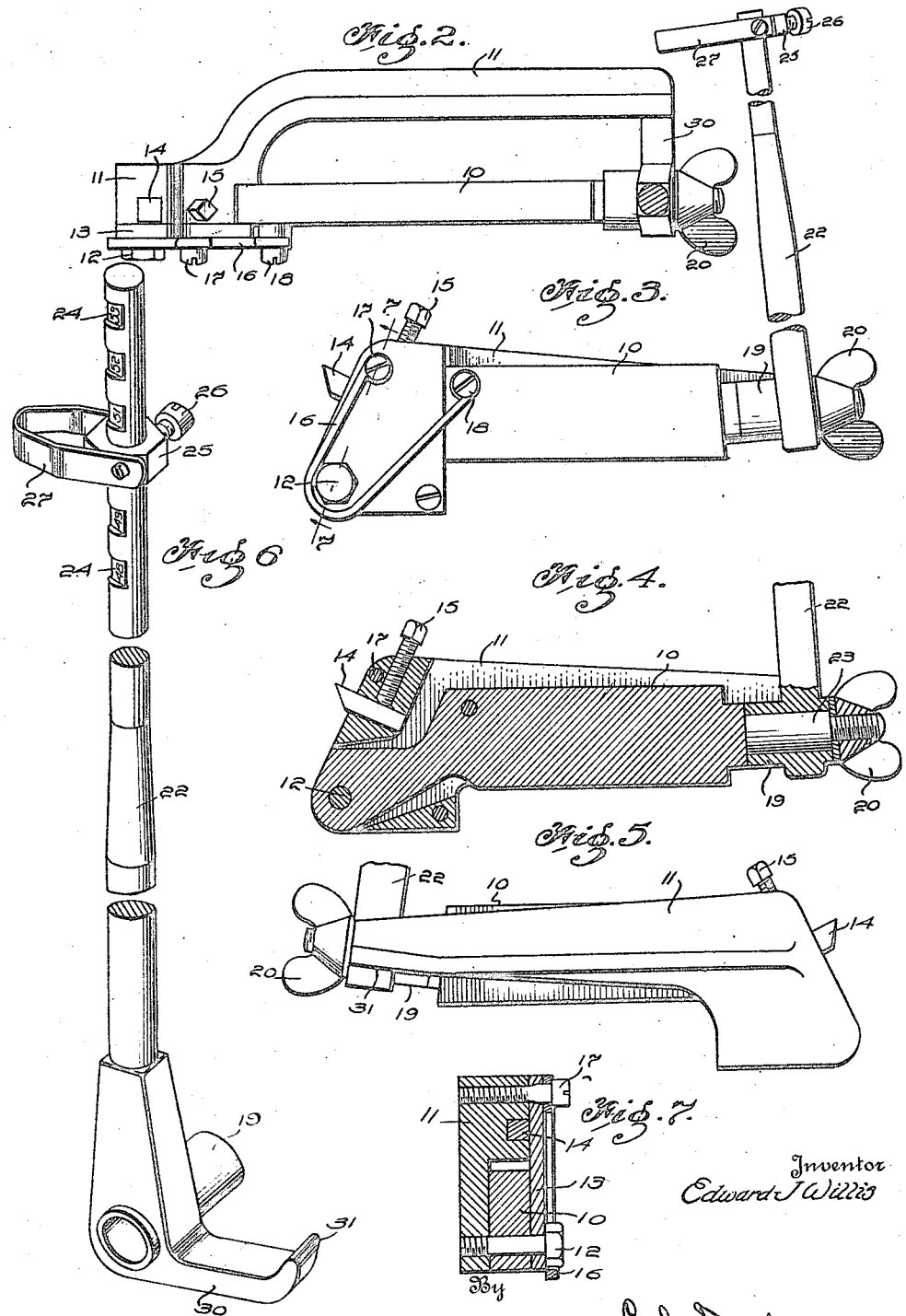

UNITED STATES PATENT OFFICE.

EDWARD J. WILLIS, OF RICHMOND, VIRGINIA.

LATHE TOOL.

1,419,432.    Specification of Letters Patent.    Patented June 13, 1922.

Application filed September 2, 1920. Serial No. 407,667.

*To all whom it may concern:*

Be it known that I, EDWARD J. WILLIS, a citizen of the United States, residing at Richmond, in the county of Henrico and State of Virginia, have invented certain new and useful Improvements in Lathe Tools, of which the following is a specification.

This invention relates to lathe attachments for turning tapers, and it comprises the combination with a lathe having a head stock, a tail stock, a carriage and a tool post, of a taper cutting tool body adapted to be secured in the tool post, a member pivotally secured to the front of the tool body, said member being adapted to support the cutting point and extending rearwardly to the opposite end of the tool body, a spring arranged between the tool body and the pivoted member to normally maintain said member in one position, and a rod pivotally mounted on the end of the tool body and adapted to be secured to a bracket or other suitable support on the head stock or other stationary part of the machine, said rod being provided with a crank at right angles thereto, and said crank being adapted to engage the pivoted member to swing it on its pivot against the action of the spring and advance the cutting point.

The old method of turning tapers on a lathe was by throwing the tail center out of line and swinging the piece between centers. This was found to have so many disadvantages that the modern method is to provide an extra and free traverse for the tool post and to control this traverse by a guide. These additions are expensive and pass in the trade by the name of taper cutting attachments. While much superior to the old way, they, nevertheless, have disadvantages. Even after moderate use, considerable backlash and wear develops. Duplicate work becomes difficult and even when new, an accurate setting of the guide can hardly be accomplished except by trial and error.

Taper fits for machine use have to be very accurate or they will not hold, but their range is very limited, varying from about 40/1000 of an inch per inch of length, to 80/1000 of an inch per inch of length. If steeper than this, they will not hold well and if less, will not free properly under the drift. The result is that what is needed is not a tool of wide range, but one which can be easily, quickly, and accurately adjusted, and which will stay adjusted and continue to produce duplicates. I find this can be accomplished by a very simple tool. I pivot the cutting point on the body of the tool so as to be able to swing inward to the lathe center and I control or force this inward swing by a compound lever. I fasten the end of this compound lever to the head stock by a wire or string and its movement is therefore the movement of the carriage. This produces a proportional inward movement of the cutting point and therefore the cut is a taper cut. My tool is set in the tool post as is any ordinary tool and operated in the same manner, the only difference being that it cuts taper instead of straight. Within the usual limits of shop practice, the steepness of the taper can be controlled by the point at which the wire is attached to the compound lever. At any point of attachment of this wire, the production is duplicate and by reason of the great magnification of the compound lever this adjustment is very easy, quick, and accurate.

In the accompanying drawings, I have shown one embodiment of the invention. In this showing, Figure 1 is a perspective view of a lathe showing the taper cutting attachment in position.

Figure 2 is a plan view of the taper cutting tool removed.

Figure 3 is a side elevation.

Figure 4 is a vertical longitudinal sectional view through the tool body.

Figure 5 is a side elevation of the tool, showing the pivoted member.

Figure 6 is a detailed view of the pivoted rod and crank.

Figure 7 is a sectional view on the line 7—7 of Figure 3, and

Figure 8 is a detail view of the compound lever.

Referring to the drawings, the reference numeral 1 designates generally a lathe having a head stock 2 and a tail stock 3. The lathe may be driven in any suitable manner as by belt 4, and may be provided with speed changing pulleys 5. The lathe is provided with a usual bed 6 to permit movement of the tail stock and is also provided with a carriage 7 movable on the bed, the carriage being provided with the usual slotted tool post 8 adapted to receive the body of the tool and provided with a bolt 9, whereby the body of the tool may be clamped therein.

Referring to Figures 2 to 7 of the drawings, the taper cutting attachment forming the subject matter of my invention comprises the usual tool shank 10 adapted to be arranged in the tool post. A member 11 is pivotally secured to the tool body as at 12, the pivoted member being provided with a pair of ears 13 adapted to embrace the tool body and receive the pivot pin 12. This pivoted member is provided with the usual opening for the reception of a cutting point 14 which is held therein by means of a screw or bolt 15. A spring 16 is arranged between the pivoted member and the tool body. As shown, the ends of the spring are coiled about bolts or screws 17 and 18 arranged on the tool body and the pivoted member respectively. The spring is adapted to normally retain the cutting point in withdrawn or retracted position. At the rear end of the tool body, a rod 22 is pivoted on pin 23, the rod being provided with a rocker bearing 19 surrounding the pin. The end of the pin is threaded and a nut 20 is arranged thereon to prevent displacement of the rod. This rod is provided with a plurality of notches 24 to permit graduations to be stamped on the rod. A slide 25 is arranged on the rod, the slide being provided with a set screw 26 to retain it in adjusted position. The slide carries a yoke 27 adapted to receive a flexible conecting member 28 (see Figure 1), the other end of which is secured to a suitable support 29, carried on the head stock or other stationary part of the machine. The lower end of the rod 22 is provided with an offset 30 at right angles thereto, the end 31 of which is adapted to engage the free end of the pivoted member which carries the cutting point (see Figure 2).

The operation of the device is as follows:

It may be adjusted to cut any taper within a given range by moving the slide 25 vertically on the rod 22 and securing it in proper position by means of set screw 26. The notches 24 may be provided with suitable indicia to indicate the degree of taper to be obtained when the set screw is arranged in any given notch. After the attachment has been set to cut the desired taper, the cutting point is brought into engagement with the work indicated at 32 in Figure 1 of the drawings near the tail stock. With the carriage at the right end of the lathe, the rod 22 is arranged at an angle by the cord or wire 28, and the crank carried by it is raised from its normal horizontal position elevating the rear end of the pivoted member 11 and advancing the cutting point toward the center of the work. When power is applied, the tool stock moves to the left in Figure 1 of the drawings in the usual manner. The spring 16 tends to withdraw the cutting point and move the rod 22 to a vertical position, and as the tool stock moves to the left, the slack in the cord or wire 28 permits the rod to move uniformly toward a vertical position and the cutting point to withdraw from the work. As the tool moves toward the head stock, the rear end of the pivoted member 11 is gradually lowered by the action of spring 16 and the cutting point recedes from the center of the work, thus cutting a taper. It will be apparent that the swinging of rod 22 and the engagement of pin 31 with the pivoted member 11 will cause a proportionate swinging of the member 11 on its pivot and will thus withdraw the cutting point from the center of the machine in proportion to the travel of the tool post and cutting point. I have thus provided a very simple attachment whereby tapers may be turned, the attachment being capable of use on standard lathes without the modification of the present construction.

It is to be understood that while I have shown the preferred embodiment of my invention, various changes in the shape, size, and arrangement of parts may be resorted to without departing from the spirit of the invention or the scope of the subjoined claims.

Having thus described my invention, I claim:

1. In a lathe tool for turning tapers, a carriage, a support mounted on said carriage, a cutting point carried by said support and capable of independent movement toward and away from the axis of the lathe, a spring for normally retaining the cutting point in withdrawn position, an arm pivotally mounted on said support, said arm being arranged to control the movement of the cutting tool, and a flexible element connected to said arm and to a fixed part of the lathe to control the movement of the cutting point toward and away from the axis of the lathe.

2. In a lathe tool for turning tapers, a carriage, a support mounted thereon, a cutting point pivotally mounted on said support, an arm carried by said support and means actuated by the movement of the carriage and engaging said arm for tilting the cutting point to move it toward the axis of the lathe.

3. In a lathe tool for turning tapers, a carriage, a support mounted thereon, a cutting point pivotally mounted upon said support, an arm carried by said support, and means engaging said arm and connected with a fixed part of the lathe for tilting the pivoted tool to move the cutting point toward the axis of the lathe.

4. In a lathe tool for turning tapers, a carriage, a support arranged thereon, a cutting point pivotally mounted upon said support, an arm carried by the cutting point support, and a pivoted element connected with a fixed part of the lathe and engaging said arm to operate the same, whereby upon the movement of the carriage in one direction, the cutting point is tilted and moved toward the axis of the lathe.

5. In a lathe tool for turning tapers, a carriage, a support arranged thereon, a cutting point pivotally mounted upon said support, an arm carried by the cutting point support, a pivoted element engaging said arm to operate the same, and means connecting the pivoted element with a fixed part of the lathe whereby upon the movement of the carriage in one direction the cutting point is tilted and moved toward the axis of the lathe.

6. In a lathe tool for turning tapers, a carriage, a support arranged thereon, a cutting point pivotally mounted upon said support, an arm carried by the cutting point support, a pivoted element engaging said arm to operate the same, means connecting the pivoted element with a fixed part of the lathe whereby upon the movement of the carriage in one direction the cutting point is tilted and moved toward the axis of the lathe, and means for tilting the cutting point to move it away from the axis of the lathe upon the movement of the tool in the opposite direction.

In testimony whereof I affix my signature in presence of two witnesses.

EDWARD J. WILLIS.

Witnesses:
R. MASSIE NOLTING,
AGNES E. JONES.